(12) United States Patent
Kim

(10) Patent No.: US 11,928,895 B2
(45) Date of Patent: Mar. 12, 2024

(54) ELECTRONIC DEVICE AND CONTROL METHOD THEREFOR

(71) Applicant: LG ELECTRONICS INC., Seoul (KR)

(72) Inventor: Bongsang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 905 days.

(21) Appl. No.: 16/960,003

(22) PCT Filed: Jan. 22, 2018

(86) PCT No.: PCT/KR2018/000934
§ 371 (c)(1),
(2) Date: Jul. 2, 2020

(87) PCT Pub. No.: WO2019/142958
PCT Pub. Date: Jul. 25, 2019

(65) Prior Publication Data
US 2021/0064896 A1  Mar. 4, 2021

(30) Foreign Application Priority Data
Jan. 22, 2018  (KR) ........................ 10-2018-0007552

(51) Int. Cl.
*G06V 40/70*  (2022.01)
*B60R 25/01*  (2013.01)
(Continued)

(52) U.S. Cl.
CPC .............. *G06V 40/70* (2022.01); *B60R 25/01* (2013.01); *B60R 25/255* (2013.01);
(Continued)

(58) Field of Classification Search
CPC .... G06V 40/70; G06V 40/171; G06V 40/172; G06V 40/193; B60R 25/01;
(Continued)

(56) References Cited

U.S. PATENT DOCUMENTS

2003/0152252 A1 * 8/2003 Kondo ................... G06V 40/18
                                                                       382/117
2015/0294547 A1 * 10/2015 Ito ........................... G08B 21/06
                                                                       340/576
(Continued)

FOREIGN PATENT DOCUMENTS

| CN | 201201570 | * 3/2009 | ............ B60R 25/25 |
| JP | 2015176555 | 10/2015 | |
| KR | 101688168 | 12/2016 | |

OTHER PUBLICATIONS

PCT International Application No. PCT/KR2018/000934, International Search Report dated Oct. 24, 2018, 3 pages.

*Primary Examiner* — Amara Abdi
(74) *Attorney, Agent, or Firm* — LEE, HONG, DEGERMAN, KANG & WAIMEY

(57) ABSTRACT

An electronic device and a control method therefor are disclosed. The present invention comprises: a camera; a memory for storing user face authentication information and an authentication pattern; and a control unit for recognizing a face from an image acquired through the camera, performing a first authentication that determines whether the recognized face matches the face authentication information, tracking the movement of a gaze of the recognized face when the first authentication is completed, and performing a second authentication that determines whether the movement of the gaze matches the authentication pattern. According to the present invention, a dual authentication step using (Continued)

the face authentication information and the movement of the gaze of the user can be conveniently performed.

10 Claims, 17 Drawing Sheets

(51) Int. Cl.
*B60R 25/25* (2013.01)
*B60R 25/30* (2013.01)
*G06F 21/32* (2013.01)
*G06F 21/36* (2013.01)
*G06F 21/45* (2013.01)
*G06V 40/16* (2022.01)
*G06V 40/18* (2022.01)

(52) U.S. Cl.
CPC ............ *B60R 25/305* (2013.01); *G06F 21/32* (2013.01); *G06F 21/36* (2013.01); *G06F 21/45* (2013.01); *G06V 40/171* (2022.01); *G06V 40/172* (2022.01); *G06V 40/193* (2022.01); *B60R 2325/10* (2013.01)

(58) Field of Classification Search
CPC . B60R 25/255; B60R 25/305; B60R 2325/10; G06F 21/32; G06F 21/36; G06F 21/45; G06F 21/31; G06F 3/013; B60W 40/08; B60W 2040/0809; G06T 7/20; H04M 1/725; H04M 1/72403; H04M 2201/34; H04M 2201/36; H04M 2250/52
See application file for complete search history.

(56) References Cited

U.S. PATENT DOCUMENTS

| | | | |
|---|---|---|---|
| 2015/0363642 A1* | 12/2015 | Irie | G06F 18/23211 |
| | | | 382/103 |
| 2016/0062456 A1* | 3/2016 | Wang | G06F 3/013 |
| | | | 382/117 |
| 2016/0225012 A1 | 8/2016 | Ha et al. | |
| 2017/0053109 A1* | 2/2017 | Han | G06F 21/32 |

* cited by examiner

[Figure 1]
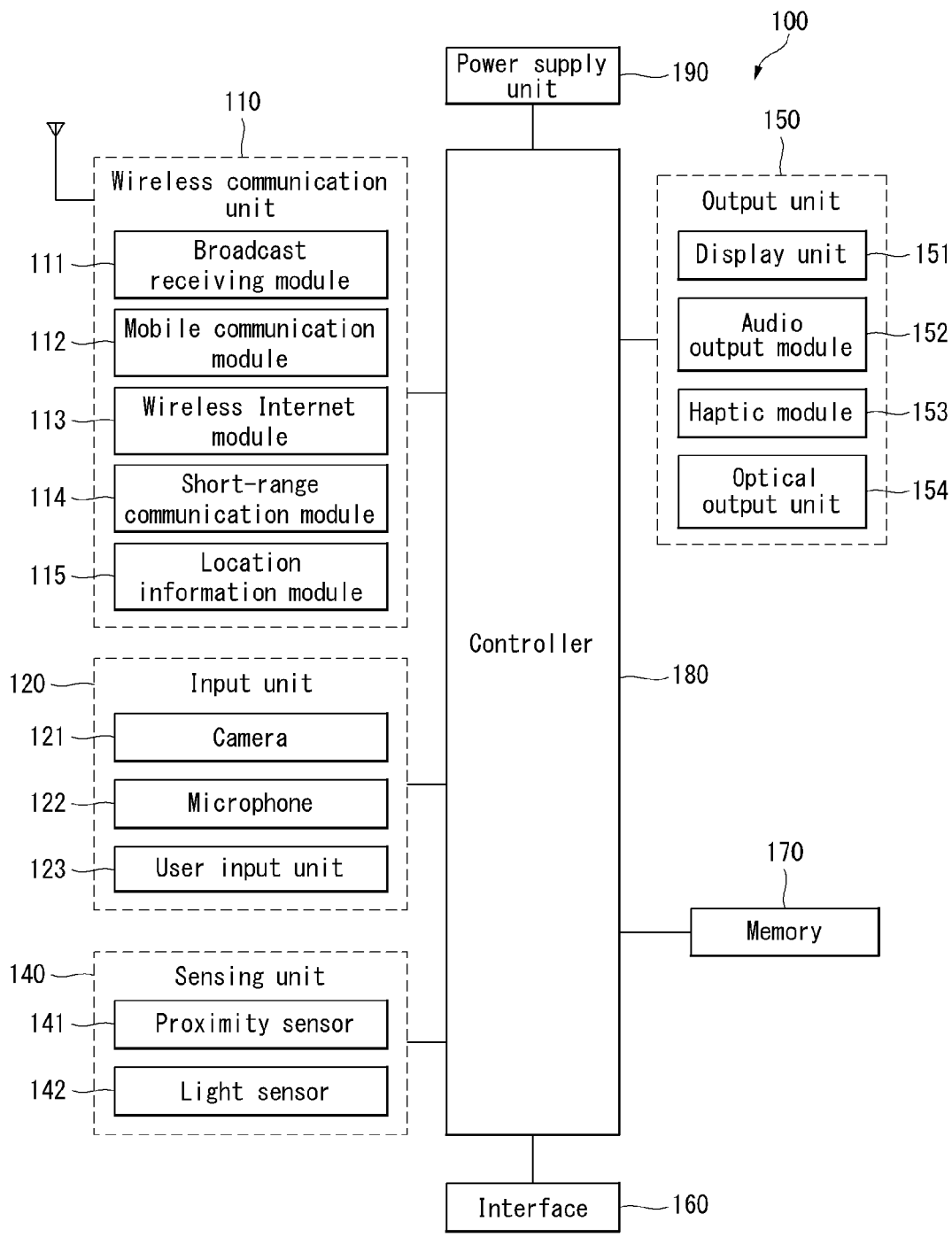

[Figure 2]
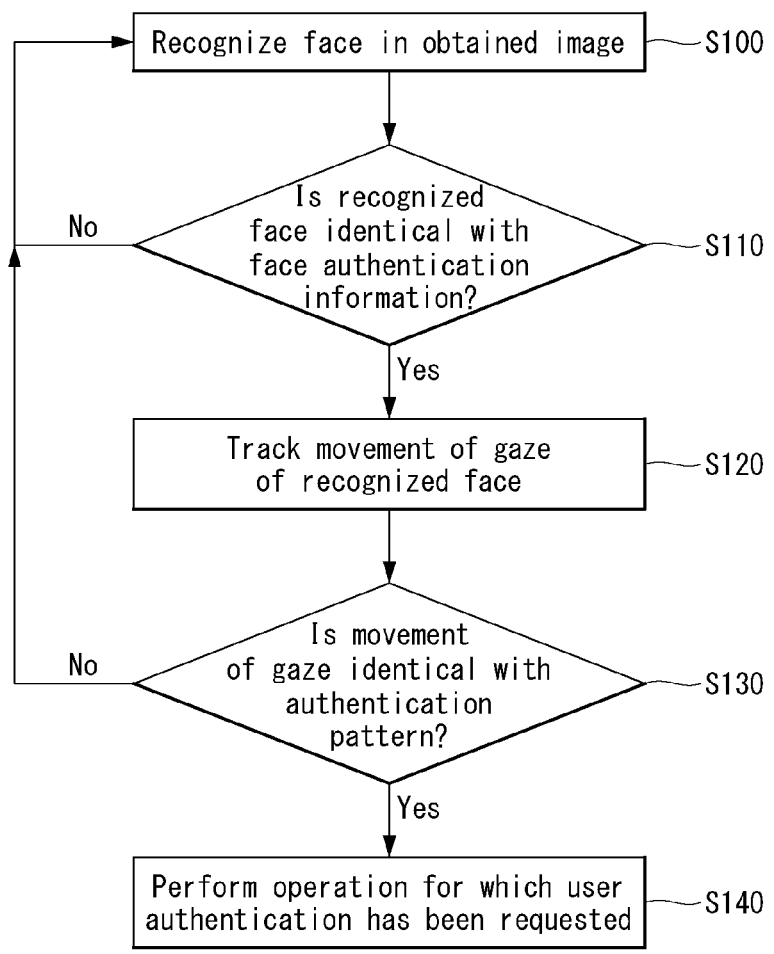

[Figure 3]
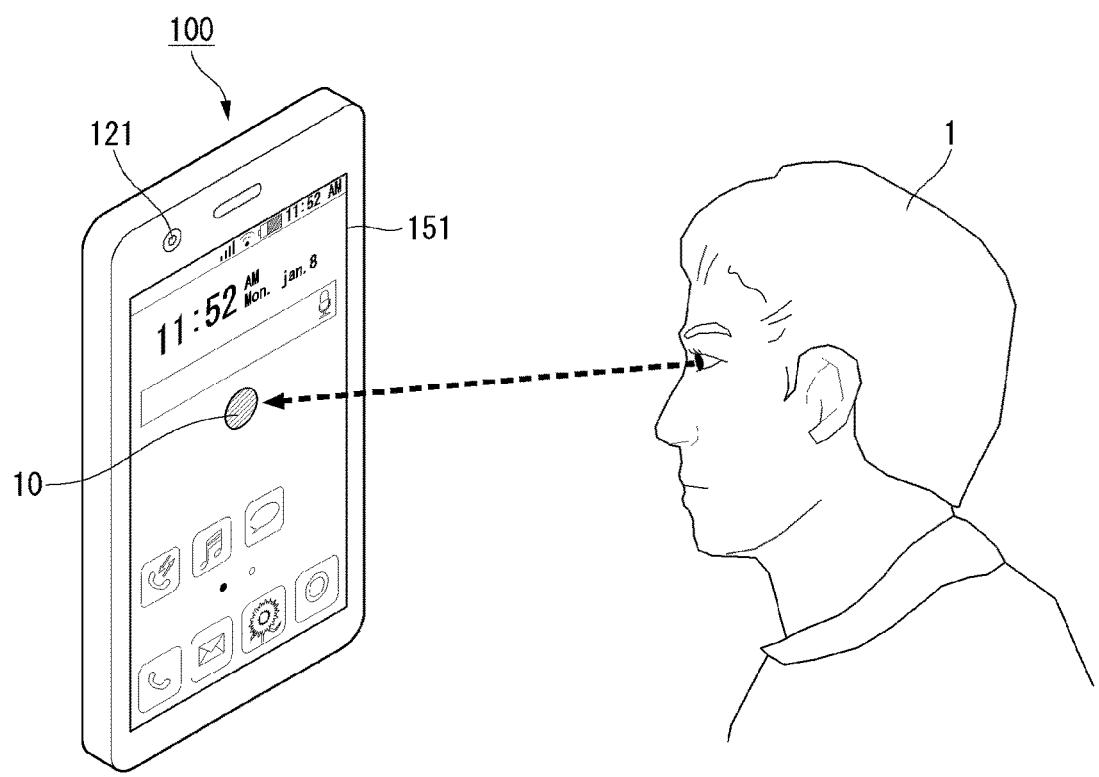

【Figure 4】
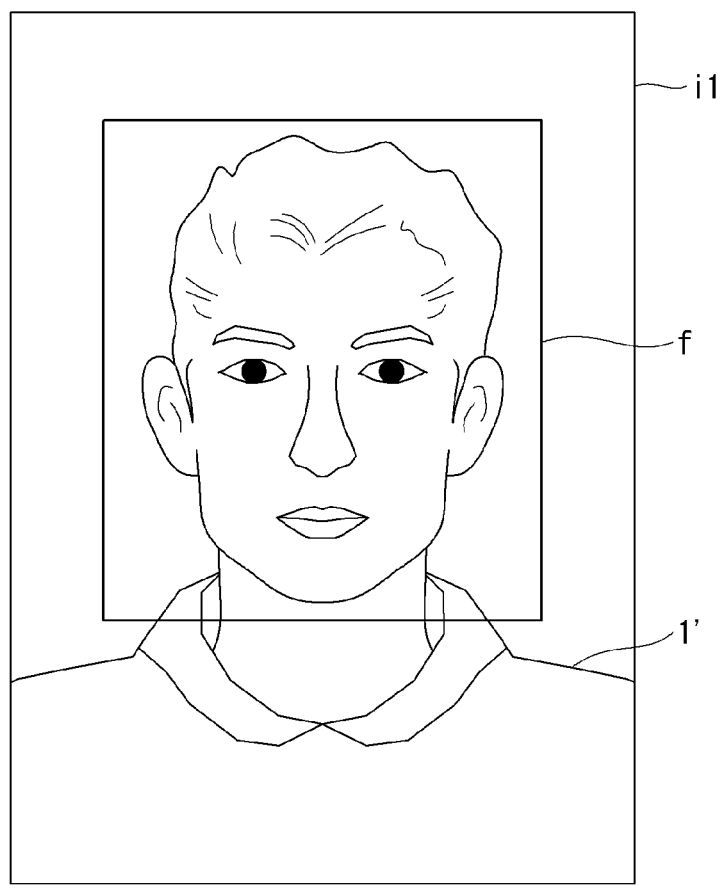

[Figure 5]
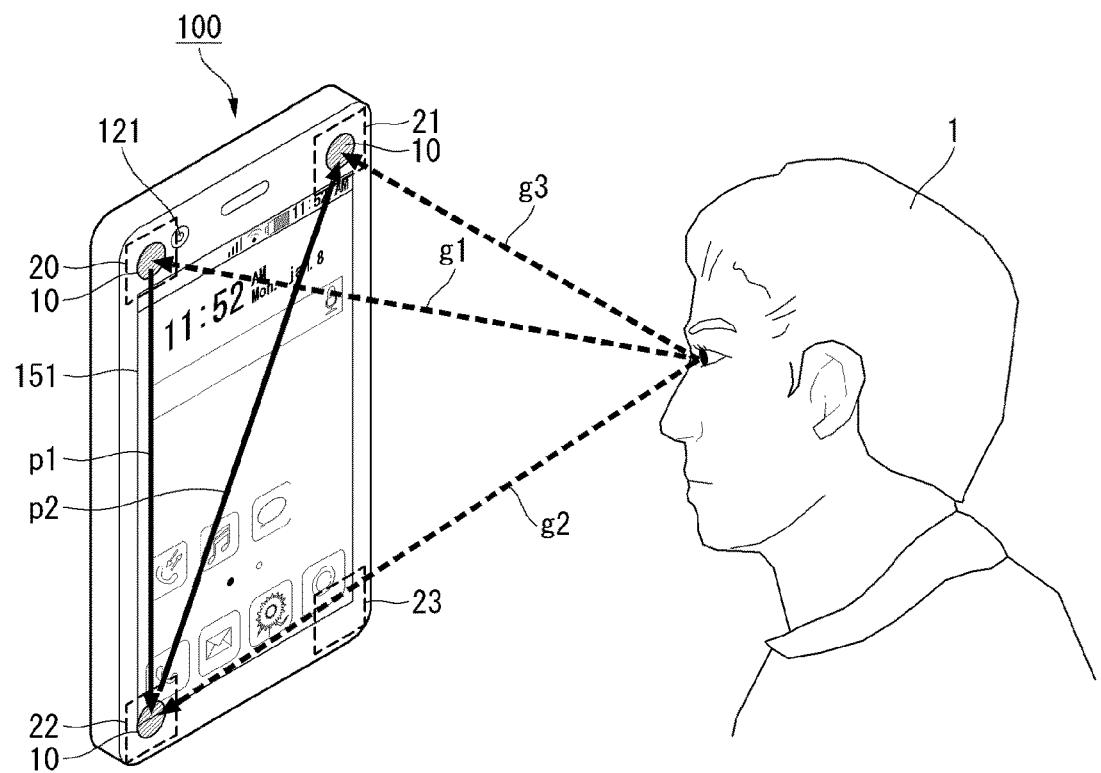

[Figure 6]
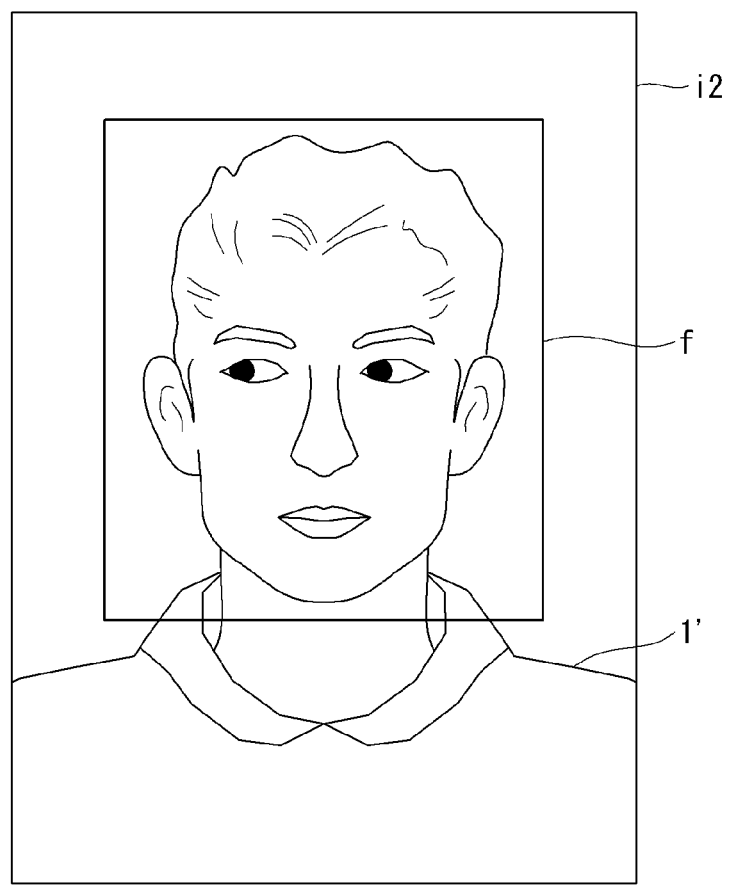

[Figure 7]
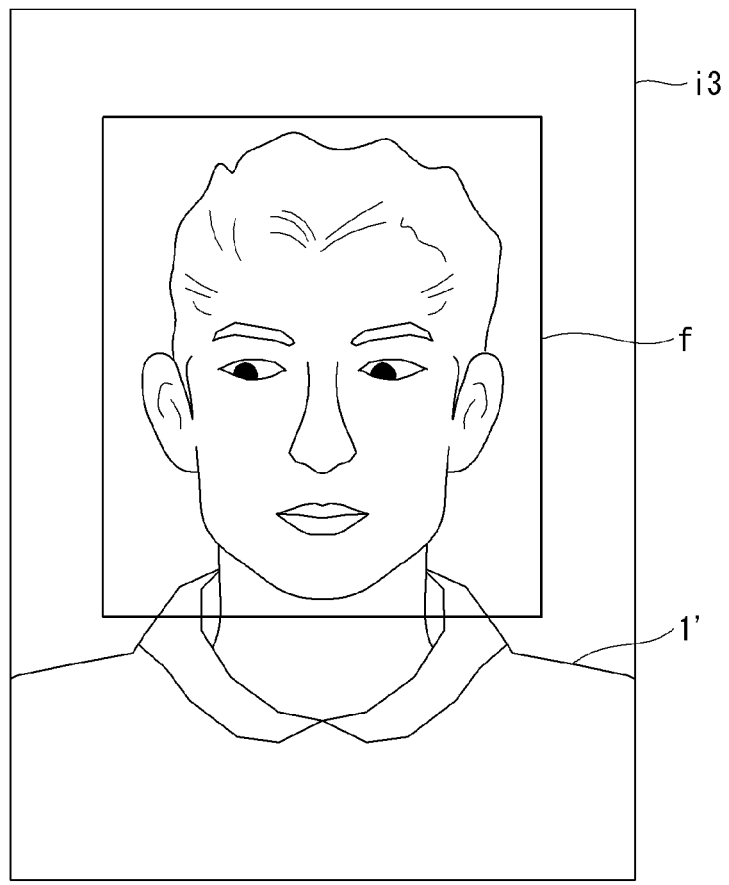

[Figure 8]
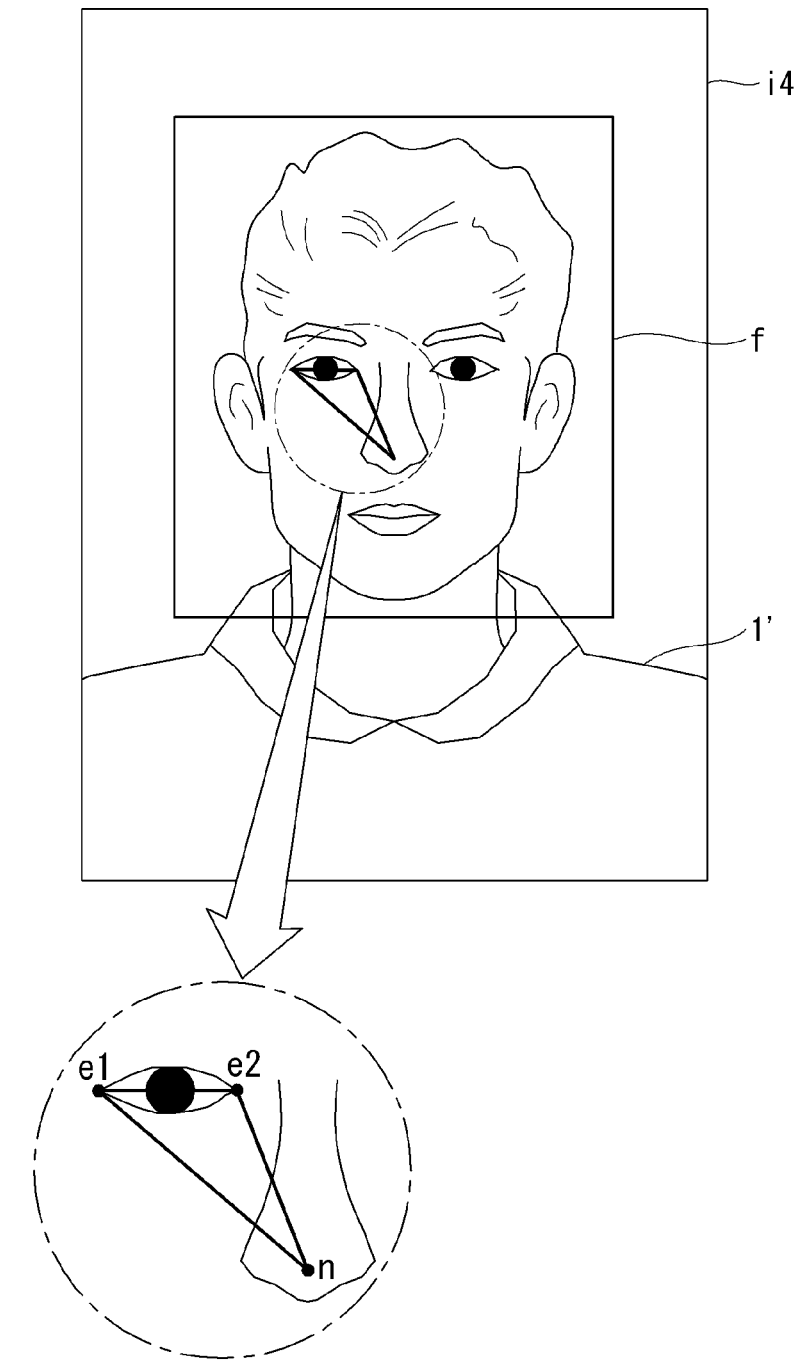

[Figure 9]
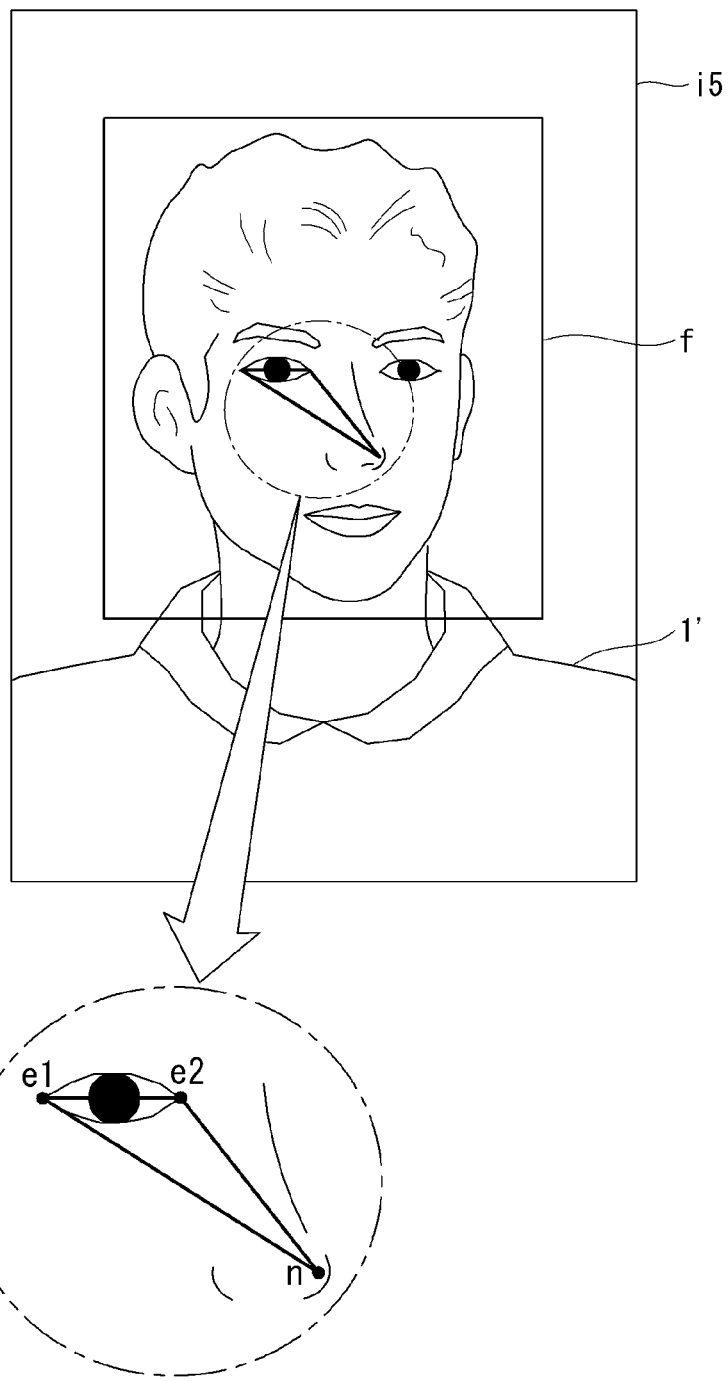

[Figure 10]
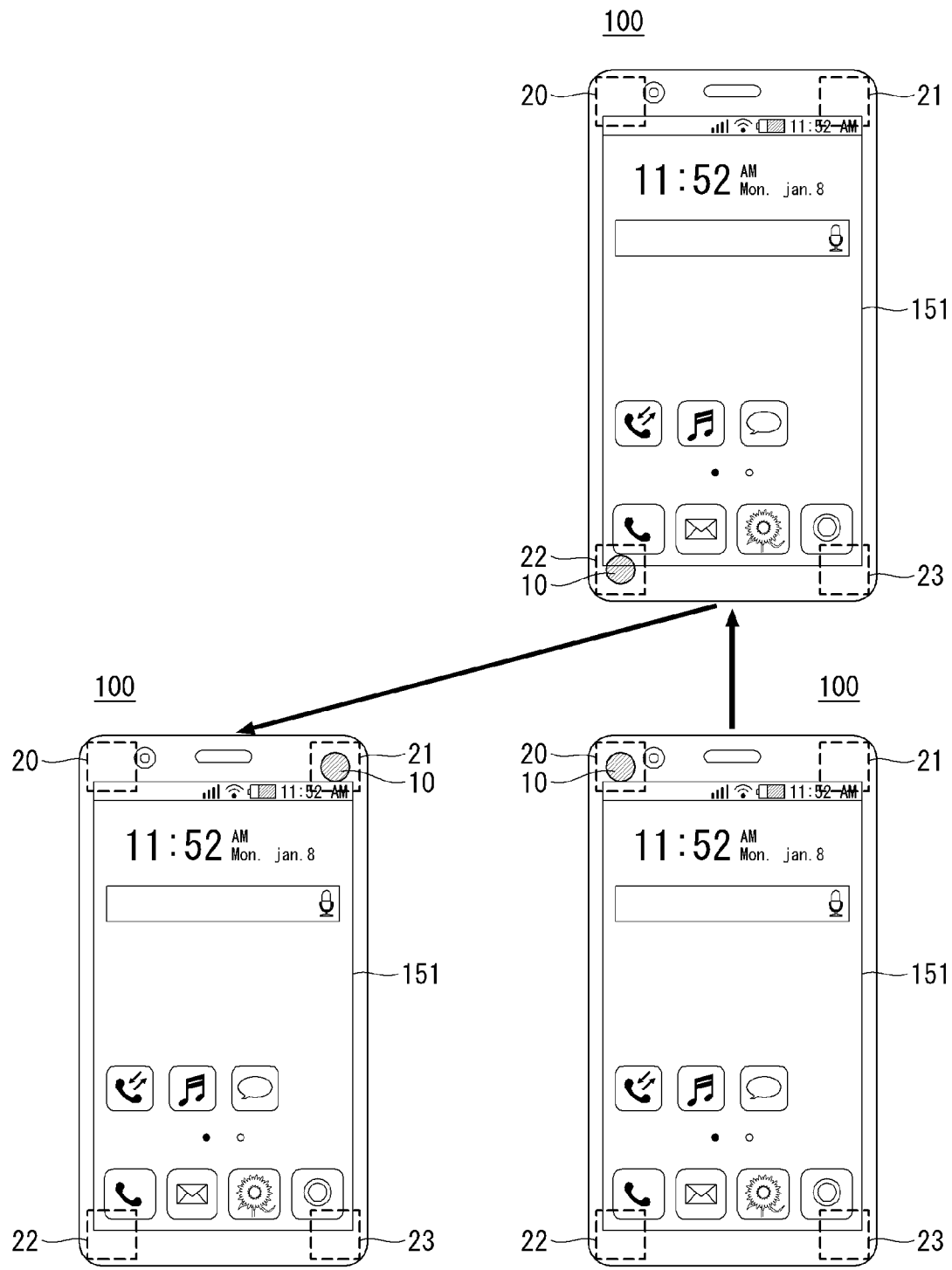

[Figure 11]
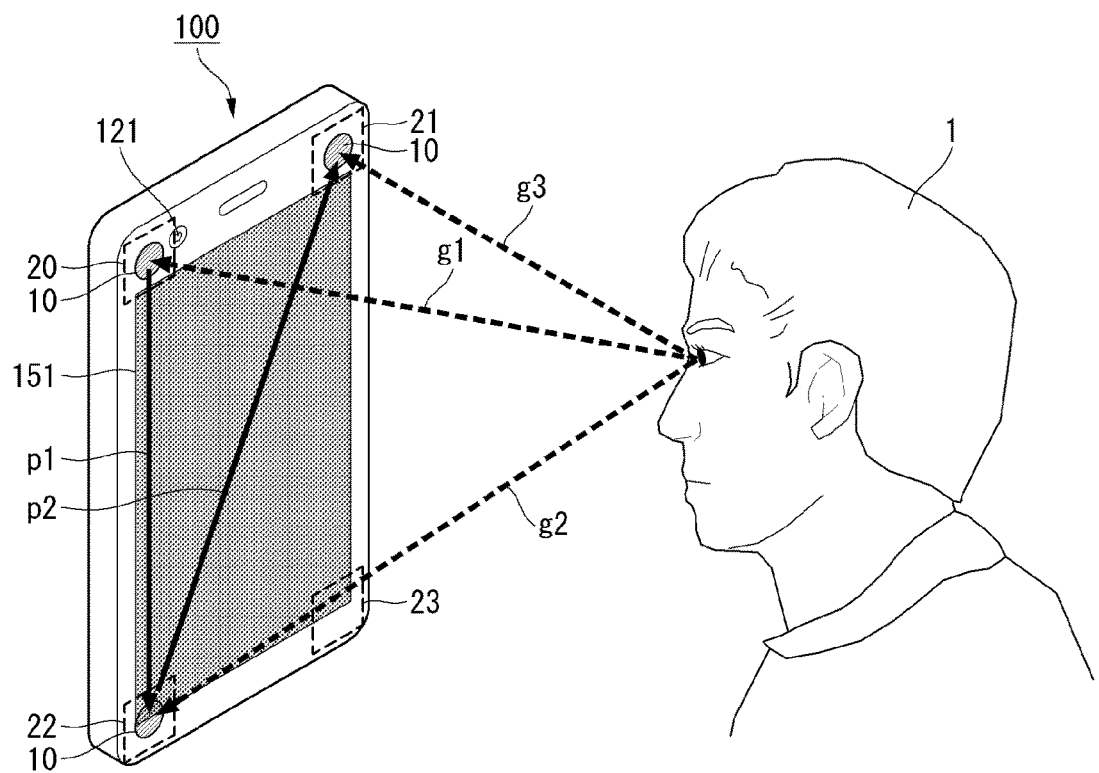

[Figure 12]
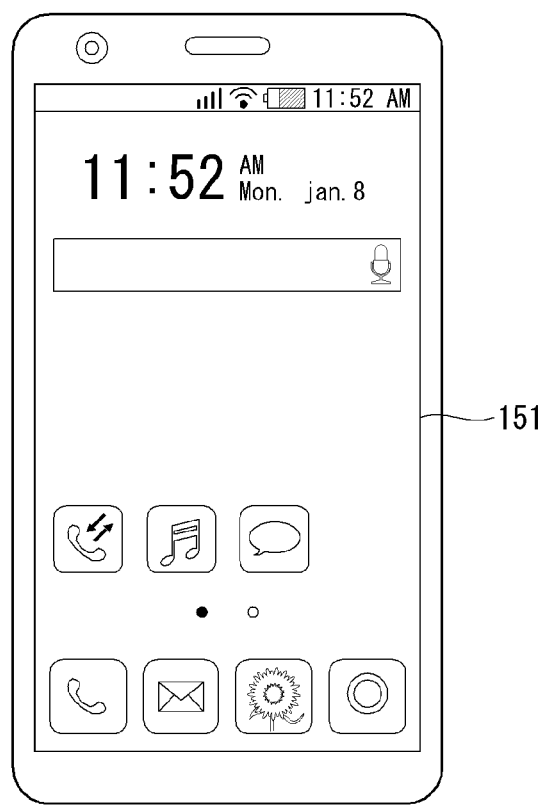

【Figure 13】
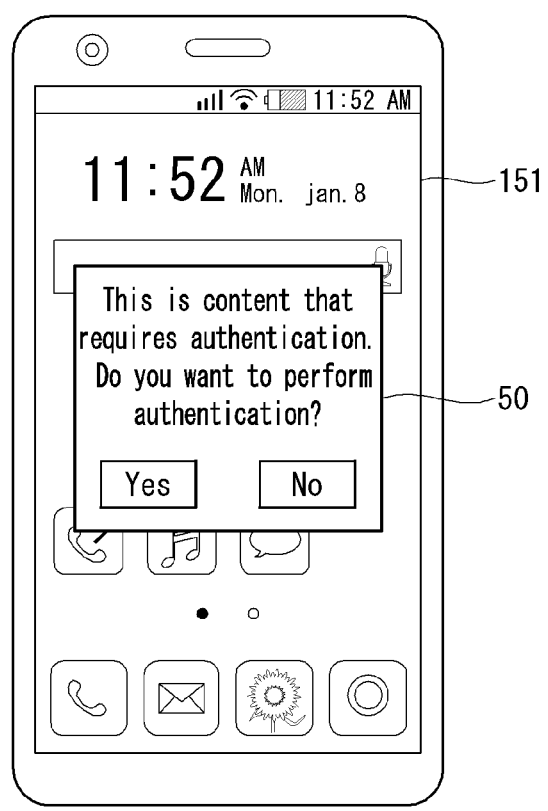

[Figure 14]
(a) 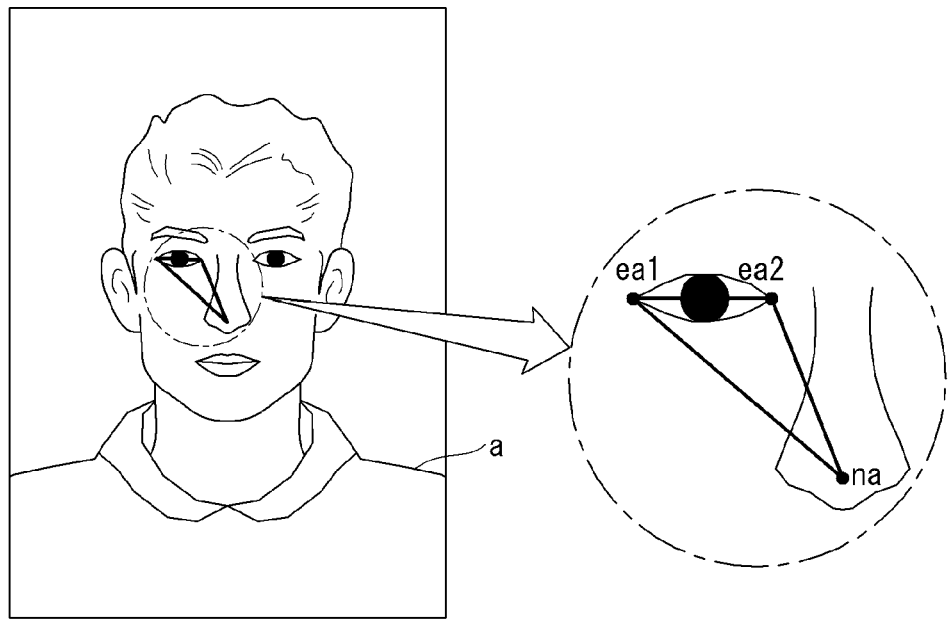
(b) 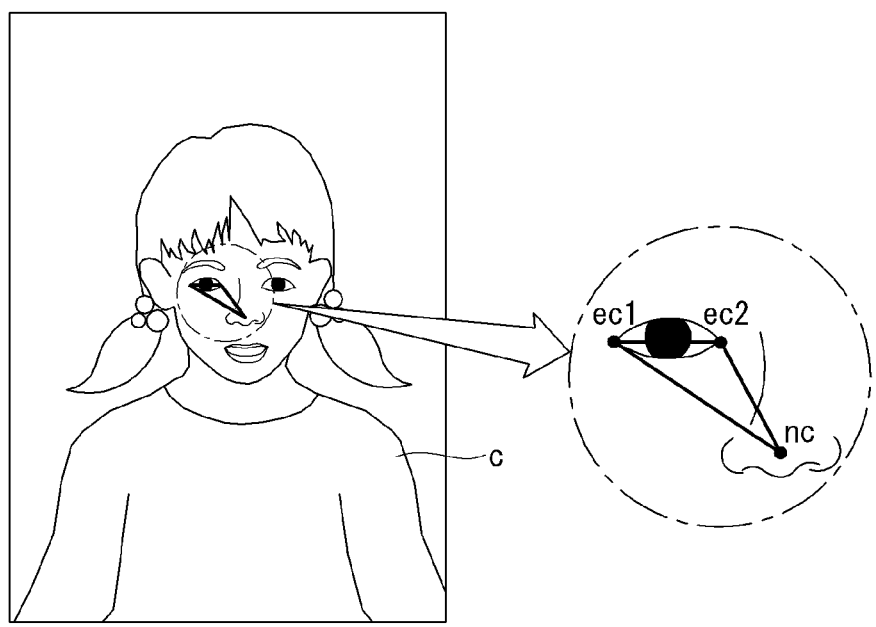

【Figure 15】
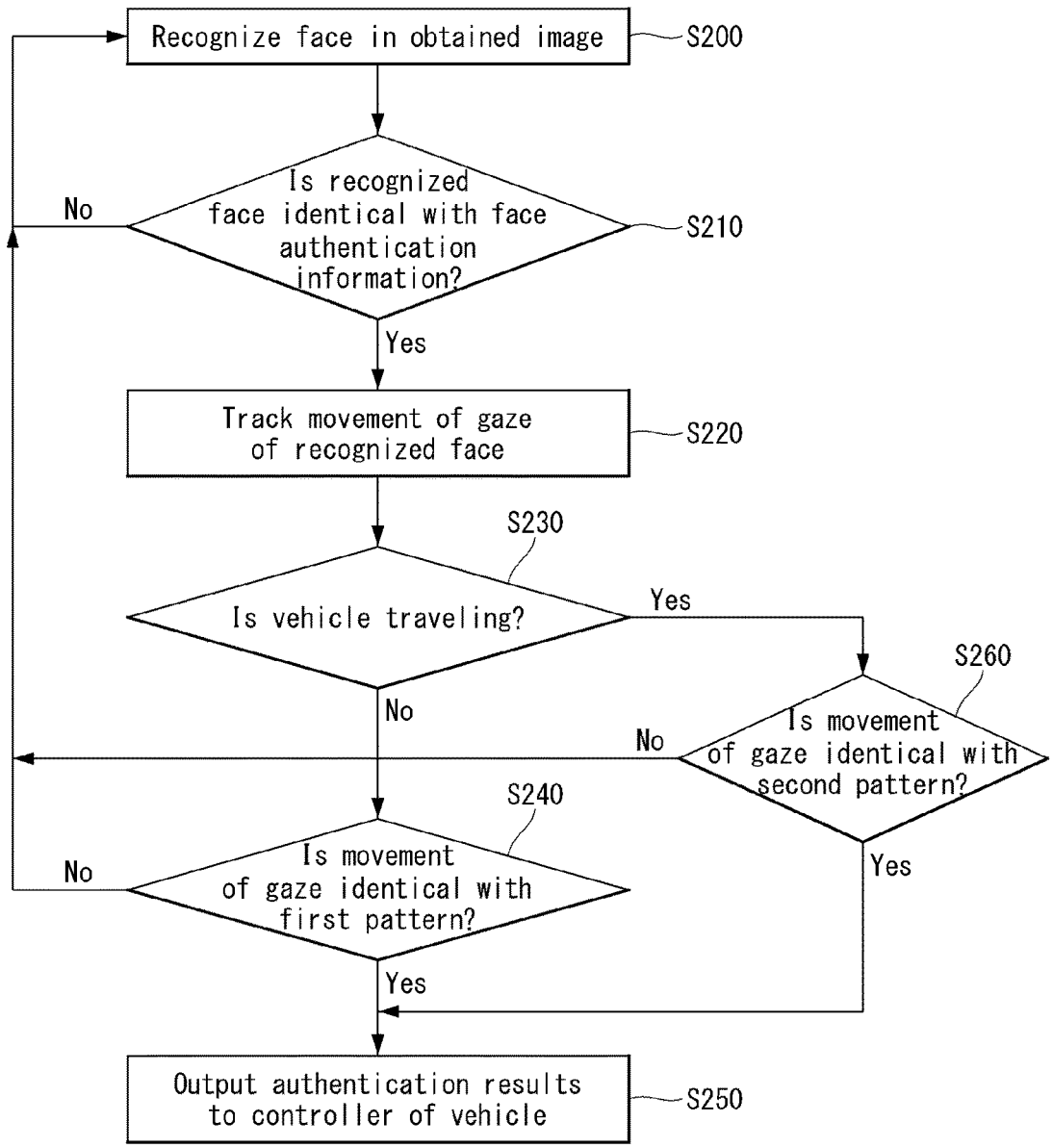

[Figure 16]
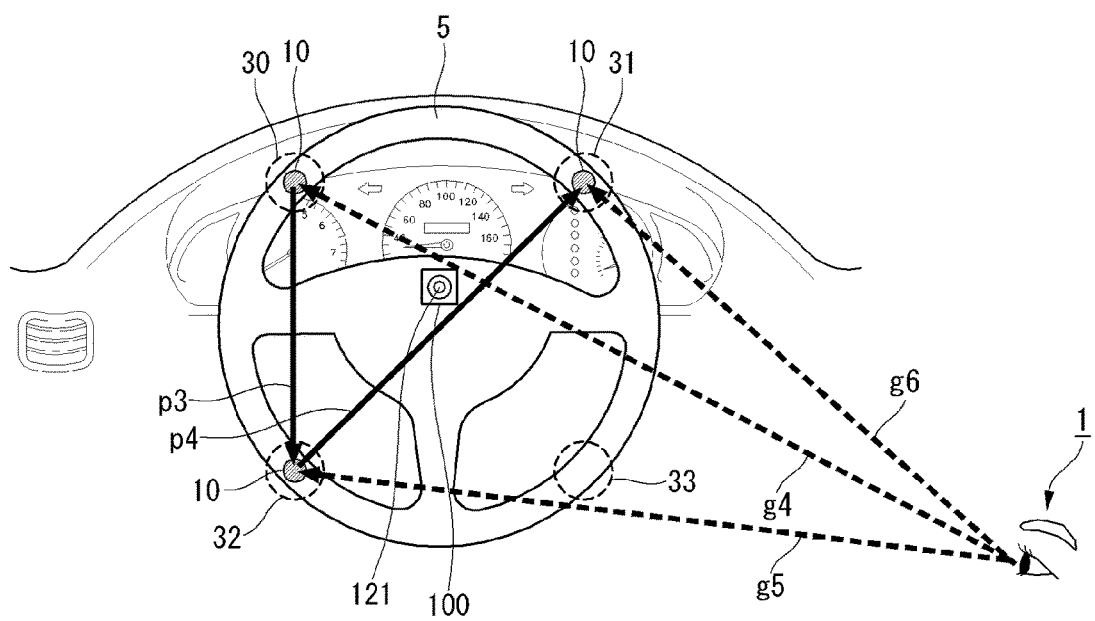

[Figure 17]
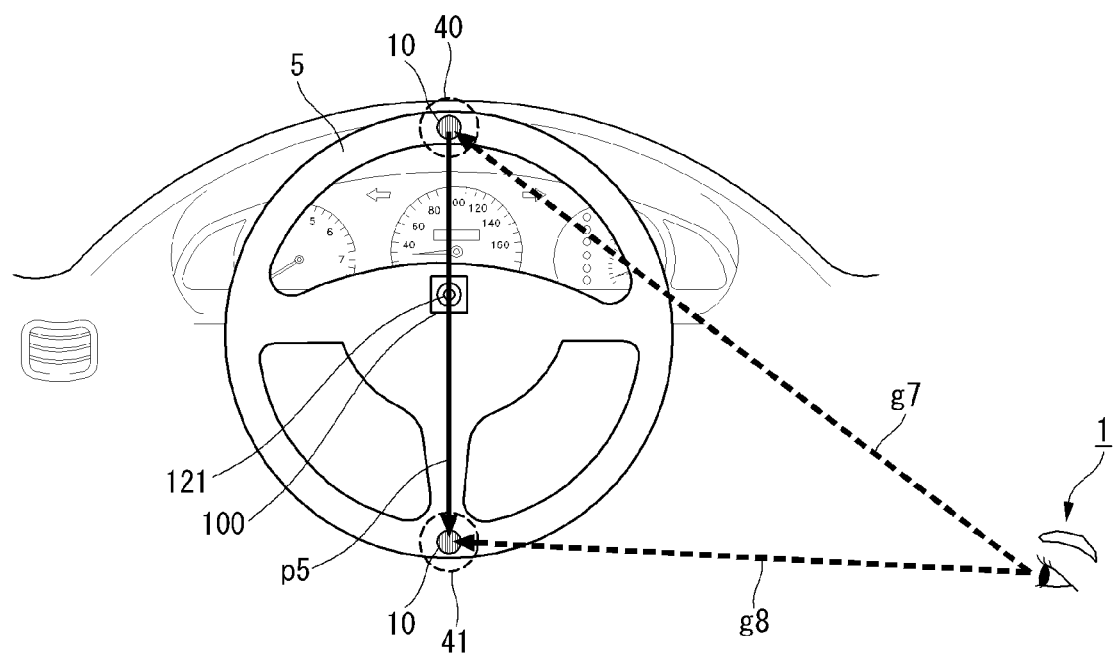

ELECTRONIC DEVICE AND CONTROL METHOD THEREFOR

CROSS-REFERENCE TO RELATED APPLICATIONS

This application is the National Stage filing under 35 U.S.C. 371 of International Application No. PCT/KR2018/000934, filed on Jan. 22, 2018, which claims the benefit of earlier filing date and right of priority to Korean Application No. 10-2018-0007552, filed on Jan. 22, 2018, the contents of which are all hereby incorporated by reference herein in their entirety.

TECHNICAL FIELD

The present disclosure relates to an electronic device which enables authentication to be performed by tracking a user's gaze with further consideration of a user's convenience and a method of controlling the same.

BACKGROUND ART

The type and function of an electronic device are further diversified. For example, a user may perform data and voice communication using an electronic device, photo photographing and video photographing through a camera, voice recording, music file playback through a speaker system, the output of an image or video, etc.

Meanwhile, as the electronic device is advances, various functions that require user authentication, such as electronic payment, are further increased. Accordingly, user authentication is performed by using the input of a password or obtaining a user's bio information, but there is an increasing demand for a user authentication method in a more convenient and improved security level.

DISCLOSURE

Technical Problem

An object of the present disclosure is to solve the aforementioned problems and other problems. Another object of the present disclosure is to provide an electronic device which enables a dual authentication process using face authentication information and a movement of the gaze of a user to be conveniently performed and a method of controlling the same.

Technical Solution

In order to achieve the above object or other objects, according to an aspect of the present disclosure, there is provided an electronic device including a camera, a memory storing face authentication information and authentication pattern of a user, and a controller configured to recognize a face in an image obtained through the camera, perform first authentication for determining whether the recognized face is identical with the face authentication information, track a movement of a gaze of the recognized face when the first authentication is completed, and perform second authentication for determining whether a movement of the gaze is identical with the authentication pattern.

The face authentication information may include a face image or feature information extracted from the face image.

The authentication pattern may include a pattern to sequentially connect selected corners among corners of the electronic device. The second authentication may be determined based on whether the movement of the gaze is sequentially performed along the selected corners based on the authentication pattern.

The movement of the gaze may be obtained through pupil tracking of the recognized face.

The movement of the gaze may be obtained using both end points of an eye and a middle point of a nose in the recognized face.

The second authentication may include whether the movement of the gaze relatively moved in response to a movement of the electronic device is identical with the authentication pattern.

The electronic device may further include a display. The camera may be an always on camera. The controller may be configured to perform the first authentication and the second authentication using an image obtained through the always on camera in a state in which the display has been off and to turn on the display when the first authentication and the second authentication are completed.

The electronic device may further include a wireless communication unit. The camera may be provided at the location where a face image of a driver may be obtained within a vehicle. The controller may output, to the controller of the vehicle, the results of the first authentication and second authentication performed on the driver through the wireless communication unit.

The camera may be provided in a steering wheel of the vehicle. The authentication pattern may sequentially connect a plurality of regions preset with respect to the steering wheel.

If the vehicle travels, the authentication pattern may be a second pattern to sequentially connect preset two regions.

Furthermore, according to another aspect of the present disclosure, there is provided a method of controlling an electronic device, including recognizing a face in an image obtained through a camera, performing first authentication for determining whether the recognized face may be identical with face authentication information stored in a memory, tracking a movement of a gaze of the recognized face when the first authentication may be completed, and performing second authentication for determining whether the movement of the gaze may be identical with an authentication pattern stored in the memory.

Advantageous Effects

Effects of the electronic device and the method of controlling the same according to the present disclosure are described as follows.

According to at least one of the embodiments of the present disclosure, there is an advantage in that a dual authentication process having improved security can be conveniently performed by performing first authentication using face authentication information and second authentication using a movement of a gaze.

Furthermore, according to at least one of the embodiments of the present disclosure, there is an advantage in that authentication can be conveniently performed based only a movement of a gaze by setting an authentication pattern using the corners of the electronic device.

Furthermore, according to at least one of the embodiments of the present disclosure, there is an advantage in that authentication can be conveniently performed although a screen of the electronic device is off by performing first authentication and second authentication using the always on camera.

Furthermore, according to at least one of the embodiments of the present disclosure, there is an advantage in that authentication for a vehicle driver can be conveniently performed by including the camera of the electronic device in a vehicle.

Furthermore, according to at least one of the embodiments of the present disclosure, there is an advantage in that authentication can be safely performed using a simpler authentication pattern while a vehicle travels.

DESCRIPTION OF DRAWINGS

FIG. 1 is a block diagram for describing an electronic device related to the present disclosure.

FIG. 2 is a flowchart of a method of controlling the electronic device according to an embodiment of the present disclosure.

FIGS. 3 to 10 are diagrams for describing that authentication is performed using face authentication information and a movement of a gaze according to an embodiment of the present disclosure.

FIGS. 11 and 12 are diagrams for describing that user authentication using an always on camera is performed according to an embodiment of the present disclosure.

FIGS. 13 and 14 are diagrams for describing that user authentication is performed on content having a user limit according to an embodiment of the present disclosure.

FIG. 15 is a flowchart of a method of controlling the electronic device provided in a vehicle according to an embodiment of the present disclosure.

FIGS. 16 and 17 are diagrams for describing that authentication is performed on a vehicle driver according to an embodiment of the present disclosure.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms including ordinal numbers such as first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115. Also, the wireless communication unit 110 further includes a PKE module 116 connected to the vehicle 200 through a wireless communication channel. The PKE module 116 is considered to be the same as a smart key module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. If desired, the sensing unit 140 may alternatively or additionally include other types of sensors or devices, such as proximity sensor 141, illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, and a biometric sensor), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information such as audio, video, and tactile output. The output unit 150 may include at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The memory 170 stores payment processing information associated with a pay application (PAY APP). The payment processing information may include credit card information or high-pass payment card preset to the mobile terminal 100 by the user. The PAY APP outputs user authentication information and payment processing information when a partner terminal or a high-pass gate requests payment and processes the payment.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

Also, the controller 180 controls some or all of the components illustrated in FIG. 1 according to the execution of an application program that have been stored in the memory 170. Furthermore, to execute the application program, the controller 180 may combine at least two or more constituting elements belonging to the mobile terminal 100.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the constituting elements above may operate in conjunction with each other to implement the operation or control of the mobile terminal according to various embodiments described below or a control method thereof. Also, the operation or control of the mobile terminal or a control method thereof may be implemented on the mobile terminal by executing at least one application program stored in the memory 170.

In what follows, before describing various embodiments implemented through the mobile terminal 100 described above, various components described above will now be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. Depending on the needs, the location information module 115 may replace or additionally perform the function performed by a specific module of the wireless communication unit 110 to obtain data related to the position of the mobile terminal. The location information module 115 is used to obtain the position (or current location) of a mobile terminal and is not limited to a module which directly calculates or obtains the position of the mobile terminal.

The PKE module 116 is connected to the three-axis LF antenna and UHF RF antenna. The base station of the vehicle 200 activates LF antennas of the vehicle in a sequential order to transmit LF messages (LF RSSI reports). An LF message may include an LF ANT ID for identifying the vehicle. The PKE module 116 of the mobile terminal 100 receives an LF message of the LF frequency band through the thee-axis LF antenna and transmits registered key information over the RF frequency band to perform user authentication. If the key information received by the vehicle 200 matches the key information of a pre-registered vehicle owner, the controller of the vehicle 200 executes a user command received from the mobile terminal 100. From the three-axis LF antenna embedded in the mobile terminal 100, if the mobile terminal 100 operates within the LF band, at which position the mobile terminal 100 is located with respect to the vehicle center may be identified accurately in terms of three-axis (X, Y, Z) coordinates. In the case of telematics or Bluetooth communication, it is impossible to know the position of the mobile terminal 100 inside a vehicle.

Next, the input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The pose detecting sensor may detect motion information such as existence of motion, movement distance, velocity, acceleration, and direction of the motion and/or attitude information such as a tilt angle of the mobile terminal 100 with respect to a predetermined rotation axis.

The pose detecting sensor 143 may include at least one acceleration sensor 144, at least one gyroscope (gyro sensor) 143, or sensing signal processing unit (not shown) compensating for a sensing value or converting sensing information.

The pose detecting sensor may obtain linear motion, rotational motion, and vibration information of the mobile terminal 100 from the acceleration detected through various sensors. The acceleration sensor 144 detects the motion of the mobile terminal 100, obtains the acceleration of the motion, and detects information about existence of motion of the mobile terminal 100, movement distance, velocity, acceleration, and direction of the motion.

Also, the gyro sensor 143 may obtain the amount of rotation by sensing rotational motion of the mobile terminal 100. The acceleration sensor 143 may express the detected acceleration in terms of a vector of three-axis coordinate values (X, Y, and Z axis), and the gyroscope may express the detected angular speed in terms of rotation vector values (roll, pitch, and yaw) with respect to the three axis. By employing the acceleration sensor 144 and the gyro sensor 143, the pose detecting sensor may determine the velocity, position, and position change of the mobile terminal 100. The pose detecting sensor may be implemented by a typical Inertial Navigation System (INS), and the gyro sensor may be an optical, mechanical, or piezoelectric type gyroscope.

Meanwhile, a sensing signal processing unit (not shown) may convert an analog signal output from the acceleration sensor or gyroscope into an analog/digital signal, integrates the converted signal, tracks a trajectory to get information about motion, angle, and vibration.

Up to this point, a pose detecting sensor including the acceleration sensor 144 and the gyro sensor 143 to obtain pose and motion of the mobile terminal according to one embodiment of the present disclosure has been described. However, the present disclosure is not necessarily limited to the specific description, and the motion and pose information of the mobile terminal 100 may also be obtained by using any sensor as long as it is able to obtain the object of the present disclosure.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like or may perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, embodiments related to a control method that may be implemented in the mobile terminal configured as above are described with reference to the accompanying drawings. It is evident to those skilled in the art that the present disclosure may be implemented in other specific forms without departing from the spirit and essential characteristics of the present disclosure.

FIG. 2 is a flowchart of a method of controlling the electronic device according to an embodiment of the present disclosure.

The method of controlling the electronic device according to an embodiment of the present disclosure may be implemented in the electronic device 100 described with reference to FIG. 1. A method of controlling the electronic device according to an embodiment of the present disclosure and an operation of the electronic device 100 for implementing the method are described in detail below with reference to required figures.

Referring to FIG. 2, the controller 180 may recognize a face in an image obtained through the camera [S100].

It is assumed that user authentication is required in order to perform payment according to electronic transactions in the electronic device 100. In this case, the controller 180 of the electronic device 100 may drive the camera 121 provided in one region of the electronic device 100.

An image including the face of a user may be obtained through the camera 121. The controller 180 may recognize the face of the user in the obtained image. A method of recognizing the face of the user is not limited to a specific method, but known technologies, such as a method of extracting a feature point within an image may be applied.

Referring back to FIG. 2, the controller 180 may perform first authentication for determining whether the recognized face is identical with face authentication information stored in the memory [S110].

A face image or face authentication information including feature information extracted from the face image may be stored in the memory 170. Face authentication information may be stored in the memory 170 in accordance with each user.

The controller 180 may compare the recognized face of the user with the face authentication information stored in the memory 170 in order to perform the first authentication. The controller 180 may extract face features from the face recognized in the image, and may compare the extracted face features with the face authentication information. However, this is an example, and various known technologies may be applied to a determination of whether the recognized face is identical with the face authentication information may be applied without a limit.

If the recognized face is not identical with the face authentication information stored in the memory 170 (No in S110), the controller 180 may repeat the aforementioned process again starting from step S100. Alternatively, the controller 180 may display, on the display of the electronic device 100, notification indicating that the recognized face is not identical with the face authentication information.

Referring to FIG. 2, the controller 180 may track a movement of a gaze of the recognized face when the first authentication is completed [S120].

When the recognized face is identical with the face authentication information stored in the memory 170 (Yes in S110), the controller 180 may track a gaze of the recognized face in order to perform second authentication. The gaze of the recognized face means the direction in which the user now gazes. The movement of the gaze may be tracked based on the location or direction of the pupils of the user within the image obtained through the camera 121. However, the present disclosure is not limited thereto, and various known technologies may be applied to the tracking of the gaze and the present disclosure is not limited to a specific method.

Referring back to FIG. 2, the controller 180 may perform second authentication for determining whether the movement of the gaze is identical with an authentication pattern stored in the memory [S130].

The authentication pattern may be a pattern that sequentially connects selected regions among a plurality of regions preset at the front of the electronic device 100. For example, if the electronic device 100 is implemented in a quadrangle, the plurality of regions may be set at the four corners of the electronic device 100, respectively.

In this case, the authentication pattern may be a pattern that randomly connects the four corners. For example, a case where a pattern in which the top left corner, bottom left corner and top right corner of the electronic device 100 are sequentially connected has been set as an authentication pattern is assumed. The controller 180 may track whether the gaze moves in order of the top left corner, bottom left corner and top right corner like the set authentication pattern.

If a movement of the tracked gaze is not identical with the authentication pattern stored in the memory 170 (No in S130), the controller 180 may repeat the aforementioned process again starting from step S100. Alternatively, the controller 180 may display, on the display of the electronic device 100, notification indicating that the second authentication is not completed.

Referring back to FIG. 2, the controller 180 may perform an operation for which user authentication has been requested [S140].

If a movement of the tracked gaze is identical with the authentication pattern stored in the memory 170 (Yes in S130), the controller 180 may perform an operation for which user authentication has been requested. For example, as assumed above, the controller 180 may perform payment according to electronic transactions because the user authentication has been completed.

Accordingly, a dual authentication process having improved security can be conveniently performed without a need for a user to perform a separate manipulation because first authentication using face authentication information and second authentication using a movement of a gaze are performed. The aforementioned authentication process is described more specifically below with reference to related figures.

FIGS. 3 to 10 are diagrams for describing that authentication is performed using face authentication information and a movement of a gaze according to an embodiment of the present disclosure.

Referring to FIG. 3, as an example of the electronic device 100, a mobile terminal in which the camera 121 is included at the front of the electronic device 100 is shown. However, this is an example, and the electronic device 100 may also include stationary electronic devices in addition to the mobile terminal.

If the electronic device 100 is used, a user 1 can see the display 151 of the electronic device 100. The gaze of the user 1 may be focused on a specific region 10 in a screen of the display 151. The specific region 10 may correspond to a region now seen by the user 1 in the screen.

If user authentication is necessary in a function being used by the user, the controller 180 may drive the camera 121. As illustrated in FIG. 4, an image i1 obtained by the driven camera 121 may include an image i1 of the user.

The controller 180 may recognize the face of the user in the obtained image i1. For example, the controller 180 may set a face region f with respect to the face recognized within the obtained image i1.

The controller 180 may perform first authentication for determining whether the recognized face included in the face region f is identical with face authentication information stored in the memory.

A face image or face authentication information including feature information extracted from the face image may be stored in the memory 170. The face authentication information may be stored in the memory 170 in accordance with each user. That is, the face authentication information may be information on a face image itself stored for each registered user or a feature point extracted from the face image.

The controller 180 may compare the recognized face of the user with the face authentication information stored in the memory 170 in order to perform the first authentication. The controller 180 may extract face features from the face recognized in the image, and may compare the extracted face features with the face authentication information. However, this is an example, and various known technologies may be applied to a determination of whether the recognized face is identical with the face authentication information without a limit.

If the first authentication is completed, the controller 180 may track a gaze of the recognized face. The controller 180 may perform second authentication for determining whether a movement of the tracked gaze is identical with an authentication pattern stored in the memory.

The authentication pattern may be a pattern that sequentially connects selected regions among a plurality of regions present at the front of the electronic device 100. As illustrated in FIG. 5, corner regions 20, 21, 22, and 23 at the front of the electronic device 100 may be set as a plurality of regions for the authentication pattern, respectively.

The authentication pattern may be a pattern that connects selected corner regions among the four corner regions 20, 21, 22, and 23 based on user setting. For example, a pattern that connects the top left corner 20, bottom left corner 22, and top right corner 21 of the electronic device 100 may be set as an authentication pattern. However, this is an example, and the same corner region may be selected again. An authentication pattern may be set as a more complicated pattern.

The set authentication pattern may be previously stored in the memory 170. The controller 180 may provide an interface for the setting of the authentication pattern. The interface may be displayed on the display 151 in the state in which a plurality of regions has been displayed in an image of the electronic device 100. The user 1 may move his or her gazes g1, g2, and g3 in order of the top left corner 20, the bottom left corner 22, and the top right corner 21. The controller 180 may store movements p1 and p2 of the gazes as an authentication pattern corresponding to the user 1.

In FIG. 5, the four corners at the front of the electronic device 100 are used for the setting of an authentication pattern, but this is an example and the present disclosure is not limited thereto. Middle regions on the sides, each one connecting two corners, may be further set as a plurality of regions for the setting of an authentication pattern, if necessary.

When the first authentication is completed, the controller 180 may track the pattern in which the gazes of the user 1 move. For example, the movement of the gaze may be obtained through the tracking of the pupils of the user within an image obtained through the camera 121.

FIG. 6 illustrates an image i2 in which the user 1 gazes at the top left corner 20 of the electronic device 100. The controller 180 may obtain the image i2 through the camera 121. The controller 180 may track a movement of the gaze based on a change in the location, size or direction of the pupils in the face region f. The pupils of the user 1 in the image i2 may move to the left top of the eyes along a movement of the gaze.

FIG. 7 illustrates an image i3 when the user 1 gazes at the bottom left corner 22 of the electronic device 100. When compared with the image i2 illustrated in FIG. 6, the pupils of the user 1 may move to the left bottom of the eyes in order to gaze at the bottom left corner 22 of the electronic device 100. A method of tracking a gaze based on a change in pupils within an image follows known technologies, and a detailed description thereof is omitted.

For another example, a movement of the gaze may be obtained using both end points of an eye of the recognized face and the middle point of the nose. FIG. 8 illustrates an image i4 when the user 1 gazes at the top left corner 20 of the electronic device 100. The controller 180 may obtain both end points e1 and e2 of an eye and the middle point n of the nose in the face region f within the image i4.

For convenience of a description, FIG. 8 illustrates only the right eye, but both end points of the left eye and the middle point of the nose may be substantially identically obtained with respect to the left eye. Furthermore, the following description using the feature points of the right eye may be identically applied to the left eye. That is, in the following description, the description is given in relation to an eye on one side, but the controller 180 may track a movement of a gaze using the feature points of both eyes.

The controller 180 may calculate a change in the distance, angle and location between the three points e1, e2 and n based on the three points e1, e2 and n. The controller 180 may track the gaze of the user 1 based on the calculated information. The image i4 illustrates a case where the user 1 gazes at the top left corner 20 of the electronic device 100.

FIG. 9 illustrates an image i5 when the user 1 gazes at the bottom left corner 22 of the electronic device 100. When compared with the image i4 illustrated in FIG. 8, the distance, angle, and location between the three points are also changed based on a change in the locations of the three points e1, e2 and n. A method of tracking a gaze using feature points of a face within an image follows known technologies, and a detailed description thereof is omitted.

Referring back to FIG. 5, the controller 180 may track whether a movement of the gaze moves in order of the top left corner 20, the bottom left corner 22, and the top right corner 21 like the set authentication pattern. As illustrated in FIG. 5, since the gaze of the user moves in order of g1, g2, and g3, the pattern p1 and p2 may be formed. The pattern based on the movement of the gaze of the user is identical with the authentication pattern, and thus the controller 180 may complete the second authentication.

For another example, the second authentication may include whether a movement of the gaze of the user 1 relatively moving in response to a movement of the electronic device 100 in the state in which the gaze has been fixed is identical with an authentication pattern. If a user moves the electronic device 100 in the state in which the gaze of the user has been fixed, a location where the gaze stays temporarily on the electronic device 100 may be relatively moved.

FIG. 10 illustrates that the electronic device 100 is sequentially moved along arrows by a user. For example, a case where the gaze of the user is placed at the top left corner 20 is assumed. When the user moves the electronic device 100 upward in the state in which the gaze has been fixed, the gaze of the user may be relatively moved to the bottom left corner 22. Likewise, when the user moves the electronic device 100 below a left diagonal line in the state in which the gaze has been fixed, the gaze of the user may be relatively moved to the top right corner 21.

That is, a movement of the gaze may be moved in order of the top left corner 20, the bottom left corner 22, and the top right corner 21 like the set authentication pattern. Since the pattern based on the movement of the gaze of the user is identical with the authentication pattern, the controller 180 may complete the second authentication.

When the second authentication is successfully completed, the controller 180 may perform an operation for which user authentication has been requested. For example, the controller 180 may perform payment according to electronic transactions for which user authentication has been requested.

Accordingly, a dual authentication process having improved security can be conveniently performed by performing first authentication using face authentication information and second authentication using a movement of a gaze. Furthermore, authentication can be conveniently performed based on only a movement of a gaze by setting an authentication pattern using the corner regions of the electronic device.

FIGS. 11 and 12 are diagrams for describing that user authentication using an always on camera is performed according to an embodiment of the present disclosure.

Referring to FIG. 11, when the electronic device 100 is in a standby mode, the display 151 may be powered off. If a lock function has been set in the electronic device 100, user authentication may be required in order to switch from the standby mode to an operation mode.

For example, the camera 121 of the electronic device 100 may be implemented as an always on camera. The always on camera may be always driven even in the standby mode of the electronic device 100 or may be driven in response to a specific input. For example, if the posture of the electronic device 100 is changed so that the front of the electronic device 100 is directed toward the user, the always on camera may be driven.

As illustrated in FIG. 11, the controller 180 may obtain an image through the always on camera 121 in the state in which the display 151 has been off. The controller 180 may perform first authentication using face authentication information and second authentication using an authentication pattern using the obtained image. The first authentication and the second authentication method are the same as those described above, and thus a detailed description thereof is omitted. When the first authentication and the second authentication are completed, the controller 180 may turn on the display 151 as illustrated in FIG. 12.

The lock function of the electronic device 100 has been described above, but the present disclosure is not limited thereto. For example, a case where the display 151 is off according to a power-saving mode while another function that requires user authentication is performed is assumed. In this case, the first authentication and the second authentication may be directly performed in the state in which the display 151 is not turned on again.

Accordingly, authentication can be conveniently performed although a screen of the electronic device is off because the first authentication and the second authentication are performed using the always on camera.

FIGS. 13 and 14 are diagrams for describing that user authentication is performed on content having a user limit according to an embodiment of the present disclosure.

Referring to FIG. 13, user authentication may be requested in order to execute content that requires authentication. The content that requires authentication may be adult content having an age limit. The controller 180 may display, on the display 151, a notification window 50 indicating that user authentication is necessary for corresponding content.

The controller 180 may perform first authentication using face authentication information. When the first authentication is completed, the controller 180 may perform second authentication using an authentication pattern. FIG. 14(*a*) illustrates that both end points ea1 and ea2 of an eye and the middle point na of the nose of an adult have been recognized in order to track a movement of the gaze of the adult. Furthermore, FIG. 14(*b*) illustrates that both end points ec1 and ec2 of an eye and the middle point nc of the nose of a child have been recognized in order to track a movement of the gaze of the child.

If user authentication according to an age limit is requested, the controller 180 may compare a movement pattern of the gaze with an authentication pattern and also further measure the distances between the feature points of the eye and the nose. In general, since the distances between both end points of an eye and the middle point of the nose of a child are shorter than those of an adult, the controller 180 may reject authentication when the distance is a preset average value or less. To this end, an average value of the distances according to an age may be stored in the memory 170.

Accordingly, safer adult authentication can be secured because user authentication according to an age limit cannot be fundamentally performed if the user is not an adult.

FIG. 15 is a flowchart of a method of controlling the electronic device provided in a vehicle according to an embodiment of the present disclosure. FIGS. 16 and 17 are diagrams for describing that authentication is performed on a vehicle driver according to an embodiment of the present disclosure.

The method of controlling the electronic device according to an embodiment of the present disclosure may be implemented in the electronic device 100 described with reference to FIG. 1. A method of controlling the electronic device according to an embodiment of the present disclosure and an operation of the electronic device 100 for implementing the method are described in detail below with reference to required figures.

Referring to FIG. 15, the controller 180 may recognize a face in an image obtained through the camera [S100].

The camera 121 may be provided at a location within a vehicle where a face image of a driver can be obtained. For example, as illustrated in FIG. 16, the camera 121 may be provided in the steering wheel of the vehicle.

For example, the electronic device 100 may be provided in the steering wheel along with the camera 121. Alternatively, for example, the electronic device 100 may be separated from the camera 121 and provided in another portion of the vehicle. In this case, the electronic device 100 and the camera 121 may be connected through short distance wireless communication. Alternatively, for example, the electronic device 100 may be implemented as a part of the control system of the vehicle.

A case where user authentication is necessary in order to start a vehicle before the vehicle travels is assumed. For example, the controller 180 may receives an authentication request for a driver from the controller of the vehicle. Alternatively, the authentication request may be received from a smart key owned by the driver.

Alternatively, a case where a manipulation according to the authentication of a user is necessary while a vehicle travels is assumed. For example, the controller of the vehicle searches for a path again, and may request authentication in order to ask a user's intention if a change manipulation of a path that is being guided is performed.

In such cases, the controller 180 of the electronic device 100 may obtain an image including the face of the user by driving the camera 121. The controller 180 may recognize the face of the user in the obtained image.

Referring back to FIG. 15, the controller 180 may perform first authentication for determining whether the recognized face is identical with face authentication information stored in the memory [S210]. Step S210 is substantially the same as step S110 in FIG. 2, and thus a detailed description thereof is omitted.

Referring back to FIG. 15, when the first authentication is completed, the controller 180 may track a movement of the gaze of the recognized face [S220]. Step S220 is substantially the same as step S210 in FIG. 2, and thus a detailed description thereof is omitted.

Referring back to FIG. 15, the controller 180 may determine whether the vehicle travels [S230].

For example, an authentication pattern may be divided and set into a first pattern when the vehicle does not travel and a second pattern when the vehicle travels. When second authentication is started, the controller 180 may read, from the memory 170, an authentication pattern corresponding to an operating state of the vehicle. In this case, a determination of the operating state of the vehicle follows a known method, and the present disclosure is not limited to a specific method.

Referring back to FIG. 15, if the vehicle does not travel, the controller 180 may determine whether a movement of the gaze is identical with the first pattern [S240].

The authentication pattern as the first pattern may be a pattern that sequentially connects selected regions among a plurality of preset regions around the camera 121 within the vehicle. As illustrated in FIG. 16, the regions 30, 31, 32, and 33 of the steering wheel 5 may be set as a plurality of regions for the authentication pattern.

The authentication pattern may be a pattern that connects selected regions, among the four regions 30, 31, 32, and 33, based on user setting. For example, a pattern that sequentially connects the top left region 30, the bottom left region 32, and the top right region 31 may be set as the authentication pattern. However, this is an example, and the same region may be selected again. The authentication pattern may be set as a more complicated pattern.

The set authentication pattern may be previously stored in the memory 170. The controller 180 may provide an interface for the setting of the authentication pattern. The interface may be displayed on the display 151 in the state in which the plurality of regions has been displayed in an image of the steering wheel 5. The user 1 may move gazes g4, g5, and g6 in order of the top left region 30, the bottom left region 32, and the top right region 31. The controller 180 may store movements p3 and p4 of the gazes as the authentication pattern corresponding to the user 1.

In FIG. 16, the four regions of the steering wheel 5 are used for the setting of the authentication pattern, but this is an example and the present disclosure is not limited thereto. Other regions of the steering wheel 5 may be further set as a plurality of regions for the setting of an authentication pattern.

The controller 180 may track whether movements of the gazes are performed in order of the top left region 30, the bottom left region 32, the top right region 31 like the set authentication pattern. As illustrated in FIG. 16, a pattern p3 and p4 may be formed because the gazes of the user move in order of g4, g5, and g6. The controller 180 may complete the second authentication because a pattern according to the movements of the gazes of the user is identical with the authentication pattern.

Referring back to FIG. 15, the controller 180 may output, to the controller of the vehicle, the results of the execution of the first authentication and the second authentication for the driver through the wireless communication unit 110 [S250].

If a movement of the tracked gaze is identical with the first pattern stored in the memory 170, the controller 180 may transmit, to the controller of the vehicle, a signal providing notification that the authentication has been completed. For example, if an authentication request is received prior to the start of the vehicle, the controller of the vehicle may receive the signal and start the vehicle.

For example, if the electronic device 100 is included in the control system of the vehicle, the controller 180 may perform an operation for which user authentication has been requested based on the completion of the second authentication.

Referring back to FIG. 15, if the vehicle travels, the controller 180 may determine whether a movement of the gaze is identical with the second pattern [S260].

For example, if a manipulation based on a user's intention is necessary while the vehicle travels, the controller of the vehicle may output, to the controller 180, a signal that asks the user's intention.

The authentication pattern as the second pattern may be a pattern that sequentially connects selected regions among two preset regions around the camera 121 within the vehicle. As illustrated in FIG. 17, the two regions 40 and 41 of the steering wheel 5 may be set as the two regions for the authentication pattern. However, this is an example, and two regions at other locations of the steering wheel 5 may be the subject of the setting of the authentication pattern.

The authentication pattern may be a pattern that sequentially connects the two regions 40 and 41 based on user setting. For example, a pattern that sequentially connects the top middle region 40 and the bottom middle region 41 may be set as the authentication pattern.

The controller 180 may track whether movements of the gazes move in order of the top middle region 40 and the bottom middle region 41 like the set authentication pattern. As illustrated in FIG. 17, a pattern p5 may be formed because the gazes of the user move in order of g7 and g8. The controller 180 may complete the second authentication because the pattern based on the movements of the gazes of the user is identical with the authentication pattern.

When movements of the tracked gaze are identical with the second pattern stored in the memory 170, the controller 180 may transmit, to the controller of the vehicle, a signal indicating that the authentication has been completed [S250]. In this case, the controller of the vehicle may perform an operation for which the authentication of the user has been requested. For example, if the approval of a user for a path change is necessary while the vehicle travels, the controller of the vehicle may determine, as the approval of the user, a signal indicating that authentication has been completed, and may change a path that is being guided.

Accordingly, authentication for a vehicle driver can be conveniently performed by providing the camera of the electronic device within a vehicle. Furthermore, if the vehicle travels, authentication can be safely performed using a simpler authentication pattern.

The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), ROM, RAM, CD-ROM, magnetic tapes, floppy disks, and optical data storages, and also include that the computer-readable medium is implemented in the form of carrier waves (e.g., transmission through the Internet). Furthermore, the computer may include the controller 180 of a terminal. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

The invention claimed is:

1. An electronic device comprising:
a camera;
a memory storing face authentication information and authentication pattern of a user; and
a controller configured to:
recognize a face in an image obtained through the camera,
perform first authentication for determining whether the recognized face is identical with the face authentication information,
track a movement of a gaze of the recognized face when the first authentication is completed, and
perform second authentication for determining whether a movement of the gaze is identical with the authentication pattern,
wherein the authentication pattern includes a pattern to sequentially connect selected corners among corners of the electronic device, and
wherein the second authentication is determined based on whether the movement of the gaze is sequentially performed along the selected corners based on the authentication pattern.

2. The electronic device of claim 1,
wherein the face authentication information includes a face image or feature information extracted from the face image.

3. The electronic device of claim 1,
wherein the movement of the gaze is obtained through pupil tracking of the recognized face.

4. The electronic device of claim 1,
wherein the movement of the gaze is obtained using both end points of an eye and a middle point of a nose in the recognized face.

5. The electronic device of claim 1,
wherein the second authentication includes whether the movement of the gaze relatively moved in response to a movement of the electronic device is identical with the authentication pattern.

6. The electronic device of claim 1, further comprising a display,
wherein the camera is an always on camera, and
wherein the controller is configured to:
perform the first authentication and the second authentication using an image obtained through the always on camera in a state in which the display has been off, and
turn on the display when the first authentication and the second authentication are completed.

7. The electronic device of claim 1, further comprising:
a wireless transceiver,
wherein the camera is provided at a location where a face image of a driver is able to be obtained within a vehicle, and wherein the controller outputs, to a controller of the vehicle, results of the first authentication and second authentication performed on the driver through the wireless transceiver.

8. The electronic device of claim 7,
wherein the camera is provided in a steering wheel of the vehicle, and
wherein the authentication pattern sequentially connects a plurality of regions preset with respect to the steering wheel.

9. The electronic device of claim 7,
wherein if the vehicle is traveling, the authentication pattern is a second pattern to sequentially connect preset two regions.

10. A method of controlling an electronic device, the method comprising:
recognizing a face in an image obtained through a camera;
performing first authentication for determining whether the recognized face is identical with face authentication information stored in a memory;
tracking a movement of a gaze of the recognized face when the first authentication is completed; and
performing second authentication for determining whether the movement of the gaze is identical with an authentication pattern stored in the memory,
wherein the authentication pattern includes a pattern to sequentially connect selected corners among corners of the electronic device, and
wherein the second authentication is determined based on whether the movement of the gaze is sequentially performed along the selected corners based on the authentication pattern.

\* \* \* \* \*